(12) United States Patent
Morris

(10) Patent No.: US 6,903,161 B2
(45) Date of Patent: *Jun. 7, 2005

(54) LOW-ACID ETHYLENE COPOLYMERS FOR IMPROVING THE ADHESION OF LDPE TO ALUMINUM FOIL IN EXTRUSION COATING

(75) Inventor: Barry Alan Morris, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 153 days.

This patent is subject to a terminal disclaimer.

(21) Appl. No.: 10/146,149

(22) Filed: May 15, 2002

(65) Prior Publication Data

US 2002/0198323 A1 Dec. 26, 2002

Related U.S. Application Data

(63) Continuation-in-part of application No. 09/679,236, filed on Oct. 4, 2000, now Pat. No. 6,437,046.

(51) Int. Cl.[7] .............................. C08F 9/00; C08L 23/00; C08L 23/04; C08L 33/00; C08L 33/02

(52) U.S. Cl. ..................... 525/191; 525/221; 525/222; 525/227; 525/240; 427/388.1; 427/407.1; 427/408; 427/409; 427/411; 427/420; 427/461; 427/464; 427/500; 427/507; 427/508; 427/509; 427/511; 427/512; 427/513; 427/514; 427/515; 427/516; 427/537.5; 264/638; 264/639; 264/642

(58) Field of Search .......................... 427/388.1, 407.1, 427/408, 409, 411, 420; 264/638, 639, 642; 428/461, 464, 500, 507, 508, 509, 511, 512, 513, 514, 515, 516, 537.5; 525/191, 221, 222, 227, 240

(56) References Cited

U.S. PATENT DOCUMENTS

| | | | |
|---|---|---|---|
| 3,954,588 A | 5/1976 | Hazan et al. | 525/240 |
| 5,281,670 A | 1/1994 | Lee et al. | 525/207 |
| 5,380,785 A | 1/1995 | Ngoc et al. | 524/504 |
| 5,587,430 A | 12/1996 | Talkowski | 525/196 |
| 5,998,019 A | 12/1999 | Rosenbaum et al. | 428/345 |
| 6,437,046 B1 * | 8/2002 | Morris | 525/191 |

FOREIGN PATENT DOCUMENTS

| | | |
|---|---|---|
| EP | 0472946 | 3/1992 |
| EP | 0588029 | 3/1994 |
| EP | 0688821 | 12/1995 |
| EP | 0849324 | 6/1998 |
| WO | 9915584 | 4/1999 |

* cited by examiner

Primary Examiner—Nathan M. Nutter
(74) Attorney, Agent, or Firm—Kevin S. Dobson

(57) ABSTRACT

This invention relates to a low-density polyethylene composition useful for coating polar substrates. This invention particularly relates to a low-density polyethylene composition useful for coating metal foils, wherein the composition comprises an ethylene/(meth)acrylic acid copolymer having a low acid content.

59 Claims, No Drawings

LOW-ACID ETHYLENE COPOLYMERS FOR IMPROVING THE ADHESION OF LDPE TO ALUMINUM FOIL IN EXTRUSION COATING

This application is a Continuation-in-Part of U.S. application Ser. No. 09/679,236, filed Oct. 4, 2000, now U.S. Pat. No. 6,437,046.

BACKGROUND OF THE INVENTION

1. Field of the Invention

This invention relates to a low-density polyethylene composition useful for coating polar substrates. This invention particularly relates to a low-density polyethylene composition useful for coating metal foils.

2. Description of the Related Art

Low density polyethylene (LDPE) can be used in packaging applications and/or other applications as a coating on polar substrates such as aluminum foil, paper, primed films, and metallized films, for example. LDPE can be useful as either a sealant, as an adhesive, or both, in these applications.

Other methods of coating LDPE on a polar surface are known, but typically LDPE can either be extrusion-coated or laminated onto a polar substrate. In such a process, the polymer is melted and coated as a curtain—that is as a thin, wide band of polymer melt carefully poured onto the substrate—as the substrate is pulled across a cold chill roll at high speed. The LDPE freezes on the cold surface of the substrate. To promote adhesion in this high-speed process, the polymer curtain can be oxidized by application of high temperature with long exposure to air or ozone, flame, corona, or other treatments. The results are inconsistent and the strength of the adhesion is not reliable, and the resulting bond is typically weak. Other problems encountered while using this process are that the coated substrate can have poor organoleptic properties, there is off-gassing, smoke generation, polymer degradation, and other processing problems.

Acid copolymer resins (ACR's), such as Nucrel®, and ionomers such as Surlyn®, available from E. I. du Pont de Nemours and Company can be used in place of LDPE to bond to polar substrates in extrusion coating or lamination processes. Resins such as these can bond well to foils in high line-speed processes having short exposure times and lower melt temperatures. These resins can include from 6 to 12 wt. % methacrylic acid or acrylic acid, and therefore can be more expensive than LDPE. Consequently, acid copolymers and ionomers are more typically used in the more demanding applications.

Some applications are moderately demanding, and can utilize acid copolymers having a lower acid content. For example, resin grades having only 4 wt % methacrylic acid, and only 3 wt % acrylic acid are available commercially for use in applications wherein only moderate performance is required of the adhesive. However, these resins can nevertheless be too expensive for most applications.

A resin with grafted anhydride functionality can be blended with LDPE and can improve adhesion to foil, but anhydride grafted resins do not bond to polar substrates well in high speed extrusion coating processes. Rubber and/or other elastomeric materials are typically added to resins having grafted anhydride functionality to improve adhesive properties. Polyolefins having acrylic acid grafted functionality of 6 wt % can be purchased commercially. These polymers cannot be processed at temperatures typical in an extrusion coating process, typically from 260° C. to 320° C. Blends of high acid copolymers or ionomers, having acid content of from 6% to 12%, with LDPE have been considered for improving adhesion of LDPE to foil because (1) high acid resin grades are normally used in extrusion coating, and (2) resins having high-acid content normally give better adhesion to foil than low acid resins. Surprisingly, however, in some cases blending high-acid acid copolymer resins with LDPE does not enhance the adhesion of LDPE to foil. More surprising in view of this is that blends of low acid copolymer resins with LDPE have significantly improved adhesion to polar substrates over LDPE.

SUMMARY OF THE INVENTION

In one aspect the present invention is a polymer blend, suitable for coating a polar substrate in a high-speed coating process, the blend comprising LDPE and a low acid content acid copolymer resin (low-acid ACR), wherein the blend includes from about 5 to about 45% by weight low acid ACR and from about 95% to about 55% by weight LDPE, and wherein the low-acid ACR is an ethylene/(meth)acrylic copolymer comprising from about 0.1 to about 4 wt % (meth)acrylic acid and from about 0 to about 20 wt % other ethylenically unsaturated comonomer.

In another aspect the present invention is a high-speed extrusion process for coating polar substrates comprising the steps: melting a blend comprising a low-acid content acid copolymer resin (low acid ACR) and LDPE, wherein the polymer blend comprises from 5 to 45% by weight low acid ACR, wherein the low acid ACR is an ethylene/(meth)acrylic copolymer comprising from about 0.1 to about 4 wt % (meth)acrylic acid, and from about 0 to about 20 wt % other ethylenically unsaturated comonomer; extruding the polymer melt as a curtain through a polymer die onto a polar substrate, wherein the substrate is moving at a line speed in the range of from about 100 feet per minute (fpm) to about 2000 fpm; and pulling the polar substrate over a cold chill roll to solidify the polymer melt on the substrate.

In another aspect, the present invention is a high-speed extrusion lamination process for coating polar substrates comprising the steps: melting a blend comprising a low-acid content acid copolymer resin (low acid ACR) and LDPE, wherein the polymer blend comprises from 5 to 45% by weight low acid ACR, wherein the low acid ACR is an ethylene/(meth)acrylic copolymer comprising from about 0.1 to about 4 wt % (meth)acrylic acid, and from about 0 to about 20 wt % other ethylenically unsaturated comonomer; extruding the polymer melt as a curtain through a polymer die onto a polar substrate, wherein the substrate is moving at a line speed in the range of from about 100 feet per minute (fpm) to about 2000 fpm; sandwiching the polymer melt between the polar substrate and a second substrate to form a laminate, and pulling the laminate over a cold chill roll to solidify the polymer melt between the two substrates.

In still another aspect the present invention is a coated article wherein the article comprises a polar substrate and a polymer coat on at least a portion of one surface of the substrate, wherein the polymer coat is a blend comprising LDPE and a low acid ACR, wherein the blend includes from about 5 to about 45% by weight low acid ACR and from about 95 to about 55% by weight LDPE, and wherein the low acid ACR is a ethylene/(meth)acrylic copolymer comprising from about 0.1 to about 4 wt % (meth)acrylic acid, and from about 0 to about 20 wt % other ethylenically unsaturated comonomer.

DETAILED DESCRIPTION OF THE INVENTION

In one embodiment, the present invention is a polymer blend useful for coating a polar substrate in a high-speed coating process. The blend comprises low density polyethylene (LDPE) and a low acid content acid copolymer resin (low acid ACR). Blends of the present invention include from about 5 wt % to about 45 wt % low acid ACR. Preferably blends of the present invention include from about 5 to about 40 wt % low acid ACR, more preferably from about 10 to about 35 wt % low acid ACR. Most preferably, blends of the present invention include from about 15 to about 30 wt % low acid ACR. Concomitantly, blends of the present invention include from about 95 wt % to about 55 wt % LDPE, preferably from about 95 to about 60 wt % LDPE. More preferably, blends of the present invention include from about 90 wt % to about 65 wt %, and most preferably from about 85 wt % to about 70 wt % LDPE.

LDPE can be manufactured by known processes, or can be obtained commercially. The LDPE is manufactured using a high pressure free radical polymerization process. Alternatively, LDPE suitable for use in the practice of the present invention can be obtained commercially from various manufacturers. For example, LDPE can be purchased from Equistar under the tradename of Petrothene. The LDPE suitable for this invention is designed for the extrusion coating/lamination process, typically has a MI (melt index, ASTM D1238, Condition 190/2.16) from 4 to 15 g/10 min and density 0.915–0.925 g/cc. Other versions of polyethylene such as linear PE and linear PE with some levels of long chain branching produced in low pressure, catalysis processes, may also be suitable for this invention, provided they are suitable for processing in extrusion coating. Blends of linear and high pressure polyethylene may also be suitable for the invention. Typically high pressure LDPE, however, is preferred in the extrusion coating process because the presence of long chain branches in the polymer provide good processing at high line speeds.

Low acid ACRs of the present invention are copolymers of ethylene and at least one $\alpha,\beta$-unsaturated carboxylic acid monomer, or a suitable derivative thereof—including ester derivatives. Low acid ACRs suitable for use herein comprise 4 wt % or less, based on the total weight of the polymer, of a carboxylic acid, preferably either acrylic acid (AA), methacrylic acid (MAA), half-esters of maleic anhydride including the mono ethyl ester (MAME) of maleic anhydride, or a mixture of any of these. For the purposes of the present invention, the term (meth)acrylic acid as used herein is shorthand notation to denote that any of these acids can be used either alone or in combination. Actual examples herein will refer to the specific acid, or the specific combination of acids. Preferably, low acid ACRs of the present invention include from about 0.1 to about 4 wt % (meth)acrylic acid, more preferably from about 0.5 to 3.5 wt % (meth)acrylic acid, and most preferably from about 1.0 to about 3.0 wt % (meth)acrylic acid.

Optionally, a low acid ACR of the present invention can include other ethylenically unsaturated comonomers in addition to (meth)acrylic acid. Other comonomers suitable for the practice of the present invention include: isobutylacrylate (iBA); n-butylacrylate (nBA); methyl acrylate; ethyl acrylate. Also suitable for use herein are $\alpha,\beta$-unsaturated diacids and their derivatives, such as for example: itaconic acid; maleic acid; fumaric acid; monoalkyl esters of any of these, such as methyl hydrogen maleate; anhydrides such as maleic anhydride; like compounds, or mixtures of any of these. A low acid ACR of the present invention can include from 0 to 20 wt % of other comonomers. Preferably, a low acid ACR of the present invention can include from about 1 to about 10 wt % of other comonomers, more preferably from about 1 to about 8 wt %, and most preferably from about 3 to about 7 wt % of other comonomers.

In a preferred embodiment, the present invention is a polymer blend as described hereinabove, wherein the low acid ACR is an ethylene/(meth)acrylic acid/iBA terpolymer that includes from about 1 to about 8 wt % of iBA. More preferably, the terpolymer includes from about 3 to about 7 wt % iBA, most preferably about 6 wt % iBA.

Acid copolymer resins of the present invention can be obtained by directly copolymerizing ethylene and (meth)acrylic acid and, optionally, other comonomers according to methods known in the art of manufacturing acid copolymer resins. Copolymers having grafted acid functionality are not suitable for the practice of the present invention. For example, an acid copolymer resin suitable for use in the practice of the present invention can be obtained by a high pressure free radical polymerization process. Low acid ACR of the present invention have melt index (MI), as determined according to ASTM D1238 (Condition 190° C./2.16 kg) of from about 2 to about 50 g/10 min. Preferably the MI is from about 6 to about 15 g/10 min, more preferably from about 6 to about 13 g/10 min, and most preferably from about 7 to about 12 g/10 min.

A low acid ACR suitable for use in the practice of the present invention and LDPE can be blended in the melt prior to the extrusion coating/lamination process using a single screw extruder, twin screw extruder, or other compounding device known in the art. Alternatively, the low acid ACR and LDPE can be blended together as pellets and introduced into the hopper of the extrusion coating/lamination extruder. Standard screws for extrusion coating can be sufficient to achieve mixing of the two resins.

Processing aides known in the art of polymer extrusion/fabrication—such as chill roll release agents, slip agents, antiblock agents, and the like—may be added to the blend in small amounts, as practiced in the art. Additives known to negatively affect the adhesion of LDPE, such as antioxidants, should be kept to a minimum.

Suitable polar substrates of the present invention include but are not limited to: metal foils such as, for example, aluminum foil; paper; primed films such as, for example, polyethylene terephthalate with a primer (PET/primer), polypropylene with a primer (PP/primer), Cellophane/primer; metallized films such as, for example, PET/metal, and PP/metal.

In another embodiment, the present invention is a process for coating a polar substrate with a polymer blend, wherein the blend comprises LDPE and a low acid ACR, as described hereinabove. A process of the present invention can be either an extrusion (or co-extrusion) process or an extrusion (or co-extrusion) lamination process. In either case, the process of the present invention is a high line speed (high-speed) process, wherein the substrate is passed through an extrusion coater at a high velocity. A high speed extrusion process of the present invention comprises the steps: melting the polymer blend; extruding the melt of the polymer blend through an extrusion die; applying the polymer melt onto a polar substrate; and pulling the polymer melt-coated substrate over a chill roll at a rapid speed, such that the polymer melt is in direct contact with the chill roll, to obtain the coated polar substrate. In a high-speed extrusion lamination process, the polymer melt is sandwiched between two substrates, the polar substrate and a second substrate, such that the second substrate is in direct contact with the chill roll. The second substrate can be either polar or non-polar.

Materials suitable as a second substrate in the process of the present invention include, but are not limited to: metal foils such as, for example, aluminum foil; paper; primed films such as, for example, polyethylene terephthalate with a primer (PET/primer), polypropylene with a primer (PP/primer), Cellophane/primer; metallized films such as, for example, PET/metal and PP/metal.

A suitable polymer melt can be obtained from a blend of LDPE and low acid ACR as described hereinabove, at a temperature above about 250° C. Preferably, the polymer melt is obtained at a temperature of from about 250° C. to about 335° C. More preferably, the polymer melt is obtained at a temperature of from about 260° C. to about 330° C., and most preferably from about 270° C. to about 320° C.

In the high-speed extrusion coating process of the present invention, the substrate is coated at a line speed of from about 100 fpm (feet per minute) to about 2000 fpm in. Preferably, the substrate is coated at a line speed of from about 100 fpm to about 1500 fpm, more preferably from about 150 to about 1400, and most preferably from about 200 to about 1300 fpm.

Maintaining a proper air gap can be critical to the process of the present invention. In the process described herein, a suitable air gap can be from about 3 to about 15 inches. Preferably the air gap is from about 3 to about 15 inches, more preferably from about 4 to about 10 inches, and most preferably from about 4.5 to about 9.5 inches.

The line speed and air gap can be combined to give a parameter known as "time in the air gap" (TIAG). TIAG=L/v, wherein L is the air gap and v is the line speed. In the practice of the present invention, TIAG is from about 7.5 to about 300 milliseconds (ms), preferably from about 30 ms to about 200 ms, more preferably from about 50 ms to about 150 ms, and most preferably from about 60 ms to about 120 ms. The preferred thickness of a coating of the present invention can depend on the application for which the coated substrate is being prepared. However, the blended polymer melt can be extruded through an extrusion die at a suitable temperature as described hereinabove, in any case a temperature above the melt temperature of the polymer blend, such that a coating of thickness less than about 5 mil is applied to the surface of the substrate. Preferably coating thickness is less than about 2, more preferably the coating thickness is less than about 1.5. The polymer melt can be combined with another polymer in a process called coextrusion coating/lamination whereby the thickness of the blended layer can be considerably less than in an extrusion coating process. Alternatively, multiple layers can be laid down by consecutive overcoatings in a process known in the art of extrusion coating as tandem coating.

Laminate structures comprising the blends of the present invention can include, but are not limited to, structures comprising layers of: paper/blend/foil/sealant; film/primer/blend/foil/sealant; foil/blend/sealant; and, metallized film/blend. Sealants can be useful for protecting a surface from the effects of the environment by providing a barrier between the surface and the environment. A suitable sealant is, for example, a polyethylene sealant film having a MI of 4 to 15 g/10 min. Suitable sealants for use in the practice of the present invention can include, but are not limited to: polyethylene; acid copolymer resins such as Nucrel®; ionomer resins such as Surlyn®; and blends of the present invention. A primer can be useful for preparing a surface so that it can more readily accept and adhere to a coating of a different material from the primer. A suitable primer can be any known or conventional primer that is effective on the surfaces of the films used herein. Suitable primers can include, but are not limited to, PEI (polyethylenimine) and polyurethane.

Films useful in the laminate structures of the present invention can include, but are not limited to: polyethylene terephthalate (PET) films; polypropylene (PP) films; and, cellophane films.

Metallized films as disclosed herein are films that are prepared by vacuum deposition or other processes known in the art. Suitable films for such use include, but are not limited to, PET and PP. Metals suitable for use in metallized films can include, but are not limited to, aluminum and copper. Such metallized films are known in the art and are conventional.

Coated substrates and laminates comprising the blends of the present invention can be useful in a variety of applications. The blends of the present invention can be useful in packaging applications as well as non-packaging applications. Packaging applications can include, but are not limited to: packaging for dry foods, including for example powdered mixes, powdered drink mixes, tea, snacks, can liners, lidding; packaging for non-food items such as for example condoms, pharmaceuticals, agricultural chemicals, shampoos, and alcohol towlettes. These applications are listed for illustrative purposes. Other packaging applications contemplated but not specified herein can nevertheless be within the scope of the present invention. One of ordinary skill in the art would know how to apply this invention to other packaging applications, given the disclosure provided herein.

The coated substrates and laminates comprising the blends of the present invention can be useful in such non-packaging applications as, for example: wire coatings; insulation; metal adhesive tapes, including aluminum adhesive tape; and air conditioning ducting. Other non-packaging applications contemplated but not specified herein can nevertheless be within the scope of the present invention.

EXAMPLES

The following examples are merely illustrations of the present invention, and not intended to limit the scope of the present invention in any way.

Example 1

Blends having the components shown in Table 1 were extrusion coated onto 2-mil foil using an coating line equipped with a 4.5-inch diameter (126-inch length) single-screw extruder, an ER-WE-PA (Egan-Davis Standard Company) feedblock and a Cloeren Edge Bead Reduction (EBR) die. Blends of the present invention were 20% by weight ACR with 80% by weight LDPE (Petrothene NA204). The resulting structure was a coated foil having a 1.5-mil coating of the blend on the foil. Melt temperature was 318–327° C. for the blend. The line speed was 400 feet per minute (fpm) and the air gap 5 inches (TIAG=63 ms).

One-inch wide strips were cut-in the machine direction (MD) from near the center of the coated foil. The coating was separated from the foil and placed into the jaws of a tensile tester. The peel strength was measured according to the procedure of ASTM F904 in a T-peel configuration with a pull speed of 12 inches per minute. The average peel strength (+/− one standard deviation) of 5 specimens for each blend is reported in Table 2. Green measurements were obtained within a few hours of production. 1-week measurements are after 1-week of aging at 50% RH, 72° F.

TABLE 1

| Resin | Description |
|---|---|
| NA204 | LDPE, 0.918 g/cc, 7 MI |
| Nucrel ® 960 | 15% MAA, 60 MI |
| Nucrel ® 1214 | 12% MAA, 14 MI |
| Nucrel ® 0411HS | 4% MAA, 11 MI |
| Nucrel ® 0403 | 4% MAA, 3 MI |
| Nucrel ® 1202 | 12% MAA, 2 MI |

TABLE 2

| | Peel Strength, g/in | |
|---|---|---|
| Blend Description | Green | 1-week |
| 100% NA204 LDPE[1] | 342 +/− 16 | 333 +/− 29 |
| 80% NA204/20% Nucrel ® 960[1] | 281 +/− 22 | 308 +/− 30 |
| 80% NA204/20% Nucrel ® 1214[1] | 355 +/− 46 | 338 +/− 22 |
| 80% NA204/20% Nucrel ® 0411HS | 590 +/− 74 | 847 +/− 52 |
| 80% NA204/20% Nucrel ® 0403 | 510 +/− 17 | 731 +/− 30 |
| 80% NA204/20% Nucrel ® 1202[1] | 311 +/− 30 | 326 +/− 13 |

[1]Not an example of the present invention

Example 2

Blends having the components shown in Table 3 were co-extrusion coated onto 2-mil foil using a coating line equipped with an ER-WE-PA (Egan-Davis Standard Company) feedblock and a Cloeren Edge Bead Reduction (EBR) die. Blends of the present invention were 20% by weight ACR with 80% by weight LDPE (Petrothene NA204). The resulting structure was a coated foil having a 0.2-mil Blend/1.0-mil LDPE (DuPont 1640) coat on the foil. DuPont 1640 has a density of 0.923 g/cc and a melt index of 4 g/10 min. The blend was melted in a 2.5-inch diameter (70-inch length) single-screw extruder and the LDPE in a 4.5-inch (126-inch length) single-screw diameter extruder. Melt temperature was 321–322° C. for the blend and 324–325° C. for the LDPE. The line speed was 400 feet per minute (fpm) and the air gap 8 inches (TIAG=100 ms).

One-inch wide strips were cut in the MD from near the center of the coated foil. The coating was separated from the foil and placed into the jaws of a tensile tester. The peel force was measured according to the procedure of ASTM F904 in a T-peel configuration with a pull speed of 12 inches per minute. The average peel strength (+/− one standard deviation) of 5 specimens for each blend is reported in Table 4. Green measurements were obtained within a few 10 hours of production. 1-week measurements are after 1-week of aging at 50% RH, 72° F.

TABLE 3

| ACR | Composition of ACR | Comment |
|---|---|---|
| 58A | 1.8% AA, 10.5 MI | Low AA copolymer |
| 58B | 1.9% AA, 6% nBA, 9.9 MI | Low AA plus nBA |
| 58C | 1.8% AA, 15% nBA, 9.5 MI | Low AA, high nBA |

TABLE 3-continued

| ACR | Composition of ACR | Comment |
|---|---|---|
| 58D | 2.2% MAA, 6% nBA, 9.7 MI | Low MAA, nBA |
| 58E | 3.9% MAME, 6% nBA, 10.2 MI | Low MAME, nBA |
| 58F | 2.2% MAA, 6% iBA, 10.1 MI | Low MAA, iBA |
| NOVEX M21N | 1.2% MAA, 7 MI | Low MAA copolymer |
| N0411HS | 4% MAA, 11 MI | Low MAA copolymer |
| NA204 | LDPE, 0.918 g/cc, 7 MI | LDPE control |

TABLE 4

| | Peel Strength, g/in | |
|---|---|---|
| Blend Description | Green | 1-week |
| 100% N0411HS[1] | 748 +/− 45 | 831 +/− 52 |
| 20% N0411HS, 80% NA204 | 517 +/− 123 | 661 +/− 100 |
| 20% 58A, 80% NA204 | 507 +/− 58 | 670 +/− 40 |
| 20% 58B, 80% NA204 | 561 +/− 15 | 694 +/− 33 |
| 20% 58C, 80% NA204 | 610 +/− 42 | 693 +/− 40 |
| 100% N0411HS[1] | 792 +/− 35 | 833 +/− 28 |
| 20% 58D, 80% NA204 | 667 +/− 29 | 712 +/− 14 |
| 20% 58E, 80% NA204 | 681 +/− 10 | 729 +/− 19 |
| 20% 58F, 80% NA204 | 643 +/− 19 | 719 +/− 10 |
| 100% NA204 LDPE[1] | 568 +/− 22 | 658 +/− 25 |
| 100% N0411HS[1] | 853 +/− 46 | 877 +/− 37 |
| 20% NOVEX M21N, 80% NA204 | 630 +/− 34 | 734 +/− 17 |

[1]Not an example of the present invention

Example 3

Blends having the components shown in Table 5 were co-extrusion coated onto 2-mil foil using a coating line equipped with an ER-WE-PA (Egan-Davis Standard Company) feedblock and a Cloeren Edge Bead Reduction (EBR) die. Blends of the present invention were 20% by weight ACR with 80% by weight LDPE (Petrothene NA204). The resulting structure was a coated foil having a 0.3-mil Blend/1.5-mil LDPE (Petrothene NA204) coat on the foil. The blend was melted in a 2.5-inch diameter (70-inch length) single-screw extruder and the LDPE in a 4.5-inch (126-inch length) single-screw diameter extruder. Melt temperature was 306–312° C. for the blend and 316–319° C. for the LDPE. The line speed was 800 feet per minute (fpm) and the air gap 5 inches (TIAG=31 ms).

One-inch wide strips were cut in the MD from near the center of the coated foil. The coating was separated from the foil and placed into the jaws of a tensile tester. The peel force was measured according to the procedure of ASTM F904 in a T-peel configuration with a pull speed of 12 inches per minute. The average peel strength (+/− one standard deviation) of 5 specimens for each blend is also reported in Table 6. Green measurements were obtained within a few hours of production. 1-week measurements are after 1-week of aging at 50% RH, 72° F.

TABLE 5

| RESIN | DESCRIPTION |
|---|---|
| Petrothene NA204 LDPE | 7 MI, 0.918 g/cc density LDPE |
| Nucrel 0411HS | 11 MI, 4% MAA |
| Novex M21N | E/1.3 wt% MAA |

TABLE 5-continued

| RESIN | DESCRIPTION |
|---|---|
| Nucrel AN4288C | 13 MI, E/7.5% iBA/4% MAA |
| E94693-132A | 9.6 MI, E/6% iBA/1.1% MAA |
| E94693-132B | 10.6 MI, E/6% iBA/1.9% MAA |
| E94693-132C | 9.9 MI, E/6% iBA/2.0% MAA |
| E94693-132D | 36 MI, E/6% iBA/1.9% MAA |
| E94693-132E | 9.8 MI, E/6% iBA/4.1% MAA |
| E94693-132F | 10.1 MI, E/10% iBA/1.9% MAA |
| E94693-132G | 10.7 MI, E/6% nBA/2.0% MAA |

TABLE 6

| Blend Description | Peel Strength, g/in | |
|---|---|---|
|  | Green | 1-week |
| 100% NA204 LDPE[1] | 146 +/− 15 | 57 +/− 11 |
| 100% Nucrel ® 0411HS[1] | 1115 +/− 164 | 1227 +/− 154 |
| 80% NA204/20% E94693-132A | 565 +/− 66 | 622 +/− 43 |
| 80% NA204/20% E94693-132B | 647 +/− 30 | 647 +/− 37 |
| 80% NA204/20% E94693-132C | 563 +/− 55 | 673 +/− 24 |
| 80% NA204/20% E94693-132D | 560 +/− 29 | 528 +/− 35 |
| 80% NA204/20% E94693-132E | 415 +/− 34 | 437 +/− 13 |
| 100% NA204 LDPE[1] | 109 +/− 19 | 22 +/− 16 |
| 80% NA204/20% E94693-132F | 451 +/− 17 | 511 +/− 24 |
| 80% NA204/20% E94693-132G | 506 +/− 16 | 540 +/− 28 |
| 80% NA204/20% Novex M21N | 542 +/− 33 | 601 +/− 30 |
| 80% NA204/20% Nucrel ® AN4228C | 426 +/− 16 | 488 +/− 27 |
| 80% NA204/20% Nucrel ® 0411HS | 531 +/− 39 | 578 +/− 11 |

[1]Not an example of the present invention

What is claimed is:

1. A polymer blend, suitable for coating a polar substrate in a high-speed coating process, the blend comprising LDPE and a low acid content acid copolymer resin (low acid ACR), wherein the blend includes from about 5 to about 40% by weight low acid ACR and from about 95% to about 60% by weight LDPE, and wherein the low-acid ACR is an ethylene/(meth)acrylic copolymer comprising from about 0.1 to about 4 wt % (meth)acrylic acid and from about 0 to about 20 wt % other ethylenically unsaturated comonomer.

2. The blend of claim 1 wherein the blend comprises from about 10 wt % to about 35 wt % of the low acid ACR and from about 90 wt % to about 65 wt % LDPE.

3. The blend of claim 2 wherein the blend comprises from about 15 wt % to about 30 wt % of the low acid ACR and from about 85 wt % to about 70 wt % LDPE.

4. The blend of claim 3 wherein the low acid ACR comprises 4 wt % or less of a carboxylic acid selected from the group consisting of: acrylic acid; methacrylic acid; half-esters derived from maleic anhydride; or a mixture of any of these.

5. The blend of claim 4 wherein the low acid comprises from about 0.1 wt % to about 4 wt % of (meth) acrylic acid.

6. The blend of claim 5 wherein the low acid ACR comprises from about 0.5 wt % to about 3.5 wt % of (meth) acrylic acid.

7. The blend of claim 6 wherein the low acid ACR comprises from about 1.0 wt % to about 3.0 wt % of (meth)acrylic acid.

8. The blend of claim 1 wherein the blend comprises from about 1 wt % to about 10 wt % other ethylenically unsaturated comonomer.

9. The blend of claim 8 wherein the blend comprises from about 1 wt % to about 8 wt % other ethylenically unsaturated comonomer.

10. The blend of claim 9 wherein the blend comprises from about 3 wt % to about 7 wt % other ethylenically unsaturated comonomer.

11. The blend of claim 10 wherein the other unsaturated comonomer is iBA.

12. The blend of claim 11 wherein the other unsaturated comonomer is iBA.

13. The blend of claim 12 wherein iBA is included in an amount of about 6 wt %.

14. A high-speed extrusion process for coating polar substrates comprising the steps: melting a blend comprising a low-acid content acid copolymer resin (low acid ACR) and LDPE, wherein the polymer blend comprises from 5 to 45% by weight low acid ACR, wherein the low acid ACR is an ethylene/(meth)acrylic copolymer comprising from about 0.1 to about 4 wt % (meth)acrylic acid, and from about 0 to about 20 wt % other ethylenically unsaturated comonomer; extruding the polymer melt as a curtain through a polymer die onto a polar substrate, wherein the substrate is moving at a line speed in the range of from about 100 feet per minute (fpm) to about 1500 fpm; and pulling the polar substrate over a cold chill roll to solidify the polymer melt on the substrate.

15. The process of claim 14 wherein the substrate is moving at a line speed in the range of from about 150 feet per minute (fpm) to about 1400 fpm.

16. The process of claim 15 wherein the substrate is moving at a line speed in the range of from about 200 feet per minute (fpm) to about 1300 fpm.

17. The process of claim 14 wherein the substrate is selected from substrates in the group consisting of: aluminum foil; paper; primed films; or metallized films.

18. The process of claim 17 wherein the substrate is aluminum foil or paper.

19. The process of claim 18 wherein the substrate is aluminum foil.

20. The process of claim 18 wherein the substrate is paper.

21. A high-speed extrusion lamination process for coating a polar substrate comprising the steps:
    melting a blend comprising a low-acid content acid copolymer resin (low acid ACR) and LDPE, wherein the polymer blend comprises from 5 to 45% by weight low acid ACR, wherein the low acid ACR is an ethylene/(meth) acrylic copolymer comprising from about 0.1 to about 4 wt % (meth)acrylic acid, and from about 0 to about 20 wt % other ethylenically unsaturated comonomer; extruding the polymer melt as a curtain through a polymer die onto a polar substrate, wherein the substrate is moving at a line speed in the range of from about 100 feet per minute (fpm) to about 2000 fpm; sandwiching the polymer melt between the polar substrate and a second substrate to form a laminate, and pulling the laminate over a cold chill roll to solidify the polymer melt between the two substrates, wherein the second substrate is selected from substrates in the group consisting of:
    aluminum foil; paper; primed films; and metallized films.

22. The process of claim 21 wherein the polar substrate is aluminum foil and the second substrate is: paper; primed films; or metallized films.

23. The process of claim 22 wherein the second substrate is a primed film.

24. The process of claim 23 wherein the primed film is a PET film, a PP film, or a Cellophane film.

25. The process of claim 24 wherein the primed film is a PET film or a PP film.

26. The process of claim 25 wherein the primed film is a PET film.

27. The process of claim 22 wherein the second substrate is a metallized film.

28. The process of claim 27 wherein the metallized film is a PET metallized film or a PP metallized film.

29. The process of claim 28 wherein the metallized film is a PET metallized film.

30. A coated article comprising the blend of any one of claims 1 through 13.

31. The article of claim 30 wherein the substrate is selected from substrates in the group consisting of: aluminum foil; paper; primed films; and metallized films.

32. The article of claim 31 wherein the substrate is aluminum foil or paper.

33. The article of claim 32 wherein the substrate is aluminum foil.

34. The article of claim 32 wherein the substrate is paper.

35. A coated article made by the process of claim 14.

36. A laminate article made by the process of claim 21.

37. A laminate article made by the process of claim 21 wherein the laminate has a structure comprising, in order, adjacent layers of (1) a second substrate, (2) primer, (3) blend, (4) polar substrate, and (5) sealant.

38. The article of claim 37 wherein (4) is aluminum foil.

39. The article of claim 38 wherein (1) is a polyethylene terephthalate film.

40. The article of claim 38 wherein (1) is a polypropylene film.

41. The article of claim 38 wherein (1) is a cellophane film.

42. The article of claim 37 wherein (2) is polyethylenimine or polyurethane.

43. The article of claim 42 wherein (2) is polyethylenimine.

44. The article of claim 42 wherein (2) is polyurethane.

45. The article of claim 37 wherein (5) is a polymer or polymer blend selected from the group consisting of: polyethylene; acid copolymer resins; ionomer resins; a blend comprising LDPE and a low acid content acid copolymer resin (low acid ACR), wherein the blend includes from about 5 to about 40% by weight low acid ACR and from about 95% to about 60% by weight LDPE, and wherein the low-acid ACR is an ethylene/(meth)acrylic copolymer comprising from about 0.1 to about 4 wt % (meth)acrylic acid and from about 0 to about 20 wt % other ethylenically unsaturated comonomer.

46. The article of claim 45 wherein (5) is an acid copolymer.

47. The article of claim 45 wherein (5) is an ionomer.

48. The article of claim 45 wherein (5) is a blend comprising LDPE and a low acid content acid copolymer resin (low acid ACR), wherein the blend includes from about 5 to about 45% by weight low acid ACR and from about 95% to about 55% by weight LOPE, and wherein the low-acid ACR is an ethylene!(meth)acrylic copolymer comprising from about 0.1 to about 4 wt % (meth)acrylic acid and from about 0 to about 20 wt % other ethylenically unsaturated comonomer.

49. A laminate article made by the process of claim 22 wherein the laminate has a structure comprising, in order, adjacent layers of (1) a second substrate, (2) blend, (3) foil, and (4) sealant.

50. The article of claim 49 wherein (1) is paper.

51. The article of claim 49 wherein (4) is selected from the group consisting of: polyethylene; acid copolymer resins; ionomer resins; a blend comprising LOPE and a low acid content acid copolymer resin (low acid ACR), wherein the blend includes from about 5 to about 45% by weight low acid ACR and from about 95% to about 55% by weight LDPE, and wherein the low-acid ACR is an ethylene!(meth)acrylic copolymer comprising from about 0.1 to about 4 wt % (meth)acrylic acid and from about 0 to about 20 wt % other ethylenically unsaturated comonomer.

52. The article of claim 51 wherein (4) is an acid copolymer.

53. The article of claim 51 wherein (4) is an ionomer.

54. The article of claim 51 wherein (4) is a blend comprising LDPE and a low acid content acid copolymer resin (low acid ACR), wherein the blend includes from about 5 to about 45% by weight low acid ACR and from about 95% to about 55% by weight LDPE, and wherein the low-acid ACR is an ethylene/(meth)acrylic copolymer comprising from about 0.1 to about 4 wt % (meth)acrylic acid and from about 0 to about 20 wt % other ethylenically unsaturated comonomer.

55. A laminate article made by the process of claim 22 wherein the laminate has a structure comprising, in order, adjacent layers of (1) sealant, (2) blend, and (3) foil.

56. The article of claim 55 wherein (1) is a polyethylene film.

57. A package comprising an article of any one of claims 30 through 55.

58. The package of claim 57 wherein the package is used to package food items.

59. The package of claim 57 wherein the package is used as a package for non-food items.

\* \* \* \* \*